United States Patent [19]

Okuyama et al.

[11] Patent Number: 4,626,993
[45] Date of Patent: Dec. 2, 1986

[54] TEACHING-PLAYBACK TYPE AUTOMATICALLY RUNNING VEHICLE

[75] Inventors: Shigeaki Okuyama, Kawachinagano; Osami Fuziwara, Kishiwada, both of Japan

[73] Assignee: Kubota, Ltd., Osaka, Japan

[21] Appl. No.: 445,755

[22] Filed: Dec. 1, 1982

[30] Foreign Application Priority Data

Feb. 19, 1982 [JP] Japan .................. 57-26569

[51] Int. Cl.⁴ .......... G05D 1/02; G05D 3/12; G06F 15/50
[52] U.S. Cl. ............... 364/424; 180/168; 364/513
[58] Field of Search ........... 318/580, 568, 576, 575, 318/578, 579; 180/169, 167, 168; 324/207, 208, 234; 364/424, 513

[56] References Cited

U.S. PATENT DOCUMENTS

| | | | |
|---|---|---|---|
| 3,095,939 | 7/1963 | Hine | 180/167 |
| 3,507,349 | 4/1970 | Comer et al. | 180/168 |
| 3,952,361 | 4/1976 | Wilkins | 180/79.1 X |
| 4,066,877 | 1/1978 | Virnot et al. | 180/168 |
| 4,114,711 | 9/1978 | Wilkins | 180/6.5 |
| 4,211,921 | 7/1980 | Kanetou et al. | 180/169 |
| 4,253,541 | 3/1981 | Iida et al. | 180/168 |
| 4,278,142 | 7/1981 | Kono | 180/168 |
| 4,328,545 | 5/1982 | Halsall et al. | 180/167 |
| 4,465,155 | 8/1984 | Collins | 364/424 |
| 4,500,970 | 2/1985 | Daemmer | 180/168 |

FOREIGN PATENT DOCUMENTS

| | | |
|---|---|---|
| 2041095 | 2/1972 | Fed. Rep. of Germany . |
| 1259720 | 1/1972 | United Kingdom . |
| 2042217 | 9/1980 | United Kingdom . |
| 2068587 | 8/1981 | United Kingdom . |

*Primary Examiner*—Felix D. Gruber
*Attorney, Agent, or Firm*—Cushman, Darby & Cushman

[57] ABSTRACT

Apparatus and method for controlling an automatically running vehicle over a predetermined course which has guidelines intermittently placed therein. Vehicle commands used to negotiate the course under manual control are stored in a memory. The vehicle has sensors which detect the presence and location of the guidelines as the vehicle passes by. The vehicle travels the course under control of the stored vehicle commands until guidelines are detected indicating the vehicle is off course. Then, vehicle control is switched so that the vehicle returns on course, over the guidelines. When the guidelines are no longer detected, vehicle control is returned to the memorized vehicle commands in such a fashion as to synchronize the actual vehicle position with the memorized data.

4 Claims, 10 Drawing Figures

TEACHING-PLAYBACK TYPE AUTOMATICALLY RUNNING VEHICLE

BACKGROUND OF THE INVENTION

(1) Field of the Invention

This invention relates to a teaching-playback type automatically running vehicle which first memorizes, during travel under manual control, the steering angle patterns of the vehicle wheels while the vehicle traverses a given distance along a course from the starting point. During subsequent passages along the course, the vehicle may be automatically run by self-manipulation of the steering angle of the vehicle wheels in accordance with the memorized pattern.

(2) Description of the Prior Art

Among the conventional unmanned automatically running vehicles there is for instance a type which automatically follows a track or guide line disposed over the entire course. Such a system has the disadvantage that in the case of a long distance course, the installation cost of the track or guide line is too high, and because of such costly installation, the course cannot easily be modified or altered after the specific course pattern has been installed. Also, installation of such a track or guide line may cause hindrance to other vehicles which may be operated along portions of the course, such as work vehicles and lawn mowers or the like. It is thus practically impossible to have an automatic running vehicle perform automatic travel by means of a track or guide installed over the entire course.

There has recently been proposed an unmanned automatically running vehicle of the teaching-playback type. Such a teaching-playback vehicle is preferred to the said guide line type in view of the fact that the teaching-playback vehicle can follow any arbitrary course pattern once the pattern is memorized. However, since a teaching-playback vehicle performs in accordance with the memorized data along, any possible initial error in the placement or orientation of the unmanned automatically running vehicle and/or errors introduced during the running of the vehicle (resulting from external disturbances such as irregular ground undulations wind forces or the like), will never be remedied but will become progressively larger and larger as the vehicle runs on and on. Improvements have therefore been desired in this regard.

SUMMARY OF THE INVENTION

The invention has as one object, in view of the drawbacks of the prior art as mentioned above, to enable the unmanned automatically running vehicle of the teaching-playback type to eliminate any initial error in the placement and departure direction of the vehicle at the starting point, and also to check any deviation or deflection from the set course and to correct same upon need, from time to time, during travel along the automatic travel course in the case where the course is long.

The automatically running vehicle according to this invention is of the teaching-playback type, provided with a first control means adapted to manipulate steerable vehicle wheels in accordance with predetermined steering angle information memorized earlier when the vehicle traveled predetermined distances from the starting point of the course. The automatically running vehicle further comprises: guide-line detectors constructed with a plurality of sensors which are disposed in left and right portions of the vehicle body and which sense when the vehicle approaches within a certain distance of objects to be sensed which may be disposed on the ground and comprise the guide line; and a second control means which controls, in response to output signals of said guide-line detectors, the vehicle body so as to keep its course along the guide line; wherein the said second control means will actively work in preference to the said first control means so long as any of the said guide-line detectors is detecting the said object to be sensed.

Considering first any initial error due to the placement of the vehicle at the starting point, the invention provides that when the guide-line detector detects a guide line which has been provided at an intermediate ground point, the second control means controls the vehicle in response to a detection signal generated by the detector when the guide line has been detected. Thus, the vehicle will keep its course along the guide line, minimizing the initial orientation error. Upon leaving the guide line and traveling further on, the vehicle is again controlled by the first control means which manipulates the steerable wheels in a series of predetermined steering angles in accordance with the data information memorized beforehand when the vehicle traveled predetermined distances from the starting point. It further is possible, by having provided some guide lines intermediately of the predetermined course, to correct any possible deviation or deflection from the said predetermined course during the vehicle travel, since the second control means consecutively comes to actively operate the vehicle in preference to the first control means so as to control the vehicle to keep its course along each of such guide lines.

It has thus been made possible, with the construction as mentioned above, to realize excellent automatic vehicle operation with minimized course deviation or deflection, even in a long distance course, and yet without requiring guide lines to cover the entire course length.

Still other objects and advantages of this invention will become apparent from the description to follow hereunder.

BRIEF DESCRIPTION OF THE DRAWINGS

The drawings show by way of example, an embodiment of the teaching-playback type automatically running vehicle according to this invention; wherein

FIG. 10 is an example of the vehicle travel course.

DESCRIPTION OF THE PREFERRED EMBODIMENTS

Figure 1:
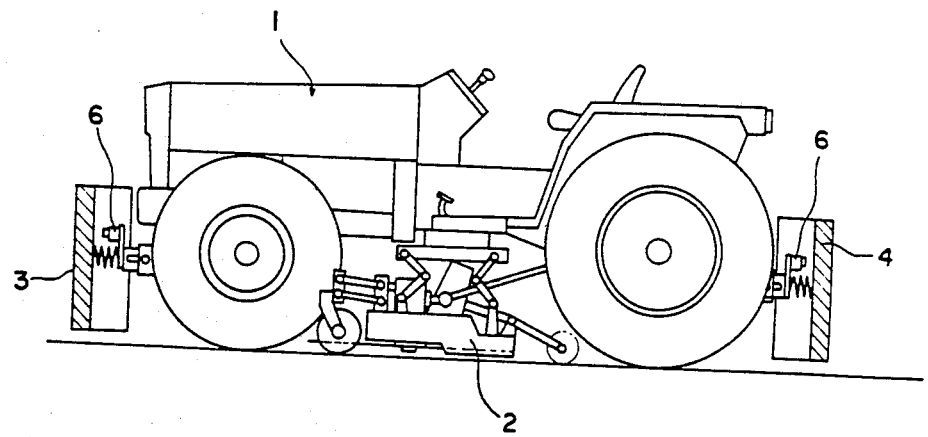
FIG. 1 is an overall side elevation of a vehicle according to the present invention.
Figure 2:
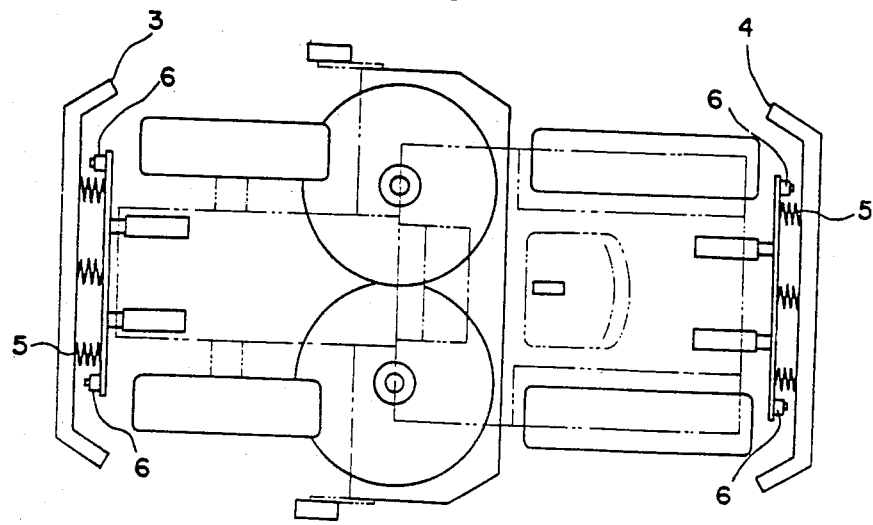
FIG. 2 is a plan view showing the lower portion structure of the FIG. 1 vehicle.

Shown in FIG. 1 is a lawn mower, as a specific example of an automatically running vehicle of the teaching-playback type according to the present invention. In an intermediate portion of the vehicle, in between front and rear wheels of the vehicle body (1), there is suspendedly provided a lawn-mowing apparatus (2) which may be adjusted to provide for free up-and-down movement. To the front and to the rear of the vehicle body (1), there are attached guide-line detectors (3), (4) by means of springs (5) as shown in FIG. 2. On mounting base portions of the vehicle, opposite the guide-line detectors (3), (4), there are provided limit switches (6) which are so constructed that a running-travel halting signal is generated upon inadvertent collision of the guide-line detectors (3), (4) against any obstacle, by contact between the detectors and these limit switches (6) to thus halt the vehicle travel accordingly.

Figure 3:
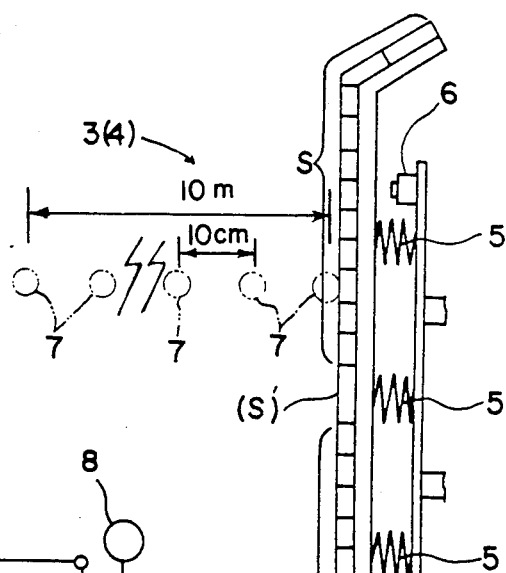
FIG. 3 is a plan view showing the structure of guide-line detectors according to the present invention.

FIG. 3 shows the construction of the guide line and the guide-line detectors (3), (4). Each guide line is here constructed with iron bolts (7), a specific example of magnetic material which are driven into the ground at the starting point and at some checking points suitably provided intermediate of the travel course. Each point includes a plurality of bolts spaced at about 10 cm intervals over a range of about 10 m for each such point. Each of the guide-line detection sensors (3), (4) is constructed with a plurality of sensors (S) disposed, for example, with eleven sensors on the lefthand side and another eleven on the righthand side, excepting a blank middle portion. Upon sensing the magnetic material pieces (7), a sensor (S) is turned to an ON state.

Figure 4:
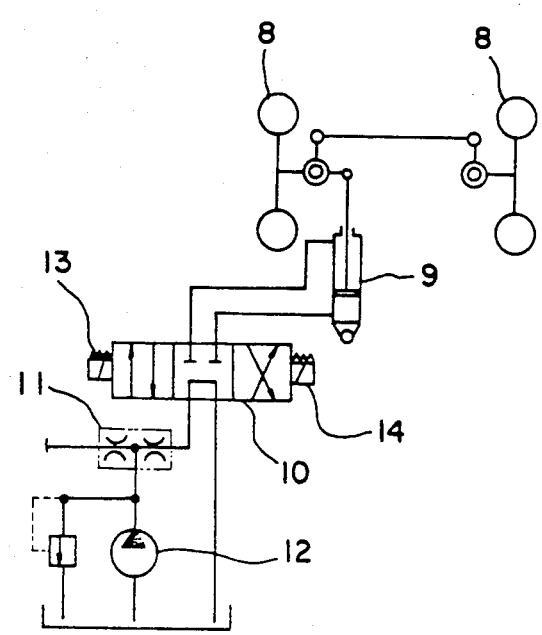
FIG. 4 is an oilhydraulic circuit diagram for steerable wheels according to the present invention.

FIG. 4 shows an oilhydraulic circuit for steering front wheels (8) which are steerable wheels of the running vehicle body (1), wherein the front wheels (8) are steered by means of an oilhydraulic cylinder (9). The oilhydraulic cylinder (9) is connected, via an electromagnetic valve (10), (which defines the flowing sense of the oil), and a branching valve (11), (which branches off a set amount of oil to the electromagnetic valve (10)), to an oilhydraulic pump (12), thus providing proportional steering control. Steering of the front wheels (8) is thus effected by actuating the left or right solenoid (13), (14) of the electromagnetic valve (10).

Figure 6:
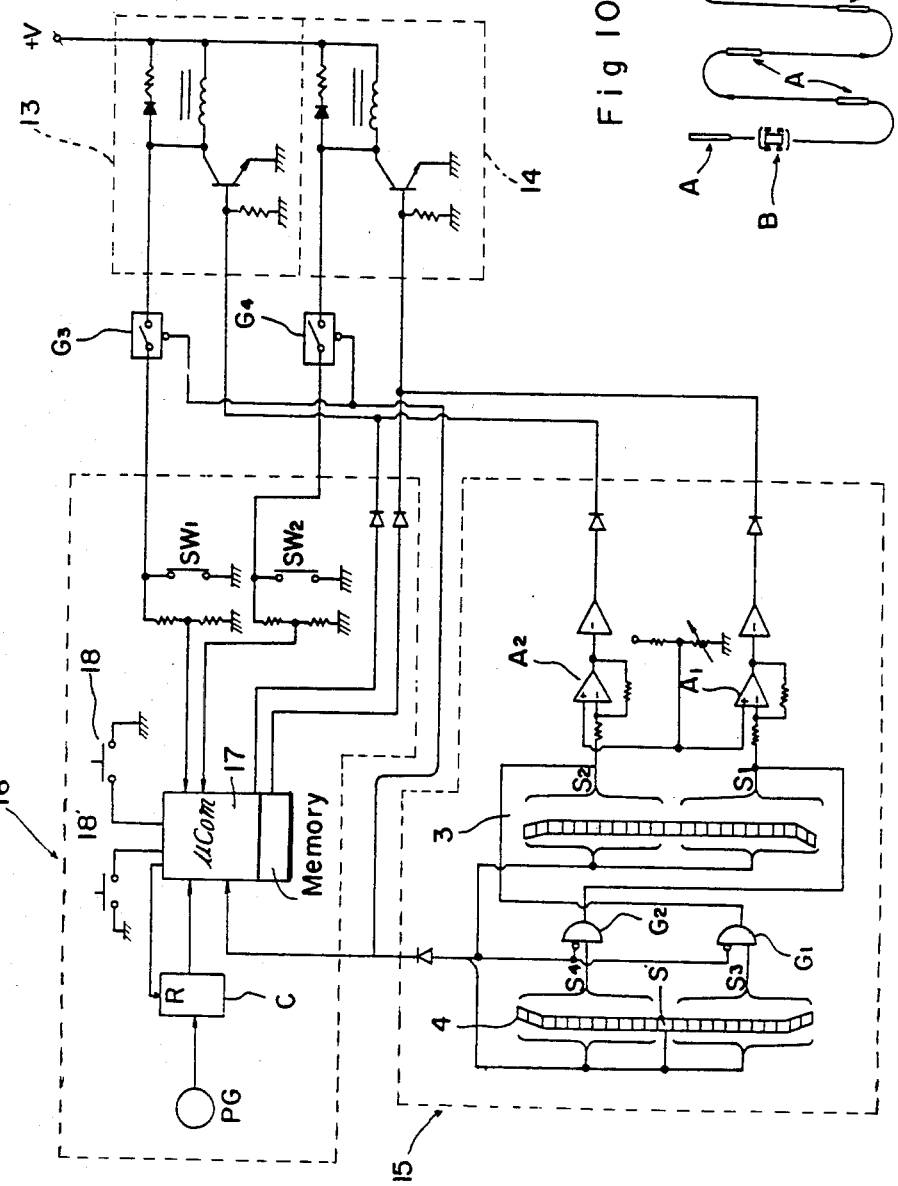
FIG. 6 is a control diagram according to the present invention.

FIG. 6 is a diagram of a control circuit which actuates the left and right solenoids (13), (14) of the electromagnetic valve (10). The control circuit comprises a guide-line-following control section (15) and a teaching-playback control section (16). The teaching-playback control section (16) is constructed with a microcomputer (17) as its central or key component, the microcomputer (17) also operating as the switching control to switch control of the vehicle between guide-line-following control and the teaching-playback control. Designated at PG is a pulse generator used for measuring the distance actually traveled. The pulse train generated by PG is input to a distance counter (C). The output of this distance counter (C) is given as an input to the microcomputer (17).

The guide-line following control section (15) has, as mentioned above, guide-line detectors (3), (4) mounted ahead of and in rear of the running vehicle body (1). The sensors (S) are disposed to the left side and to the right side, respectively from the middle portion of the guideline detectors (3), (4), and are combinedly grouped in a wired-OR manner, eleven of them on either side.

Now, if a guide line is detected at the front of the running vehicle body (1) on the lefthand side, then a corresponding one of the lefthand side sensors (S) senses the guideline and generates a high-signal ($S_1$), and this signal is amplified by means of a lefthand amplifier ($A_1$) and is used to actuate the righthand solenoid (14). In case any of the righthand side sensors (S) senses a guideline, it produces a high-signal ($S_2$) which, in a similar manner, actuates the left-hand solenoid (13). When a guide line approaches the middle portion of the detector, no output is generated. The left and right sensors (S) of the rearward side guide-line detector (4) are also combinedly grouped in a wired-OR manner. Thus, a high-signal ($S_3$) output is given when any of the lefthand side sensors (S) senses the guide-lines (7), while a high-signal ($S_4$) output is given when any of the righthand side sensors (S) senses the guideline. These signals ($S_3$), ($S_4$) are given as inputs to the respective gates ($G_1$) and ($G_2$). These gates ($G_1$), ($G_2$) receive both the inputs of the front side guide-line detector (3) in such a manner as to be blocked off when either of the inputs goes high. Thus, when both low-signal inputs ($\overline{S_1}$), ($\overline{S_2}$) are given as outputs from the front side guide-line detector (3), then a high-level output ($S_3$) of the lefthand side sensor will actuate the lefthand solenoid (13), while a high-level output ($S_4$) of the righthand side sensor will actuate the righthand solenoid (14). Namely, the front and rear detectors (3), (4) are inverse in their modes of how to actuate the solenoids (13), (14). In addition, in the middle portion of the rearward side detector (4) there is attached a sensor (S') which senses the fact that the vehicle body middle portion is properly on the guide line. It should be noted that these sensors (S) are constructed so as to be capable of delivering their signals ($S_1$)–($S_4$) respectively in two separate lines, and the signals ($S_1$)–($S_4$) on one of the two lines are given as inputs to the microcomputer (17) so that when the inputs are all low-signals ($\overline{S_1}$)–($\overline{S_4}$) the microcomputer (17) allows teaching-playback control to be effected. Also given as inputs to the microcomputer (17) are the ON/OFF signals of: a mode selecting switch (18) for change-over between the teaching and the playback modes; a main starting switch (18'); and actuating switches ($SW_1$), ($SW_2$) for the left and right solenoids (13), (14), which are manually manipulated while in the teaching mode. The guide-line following control actively works in preference to manual control, on account of the function of switches ($G_3$), ($G_4$) which can be turned off upon detection of a signal from any sensor (S) during the teaching operation. In the playback mode, the guide-line following control works in preference to the playback control, on account of the programming to be described below.

A description of the programming will now be given with reference to FIGS. 7 and 8.

Figures 7, 9:
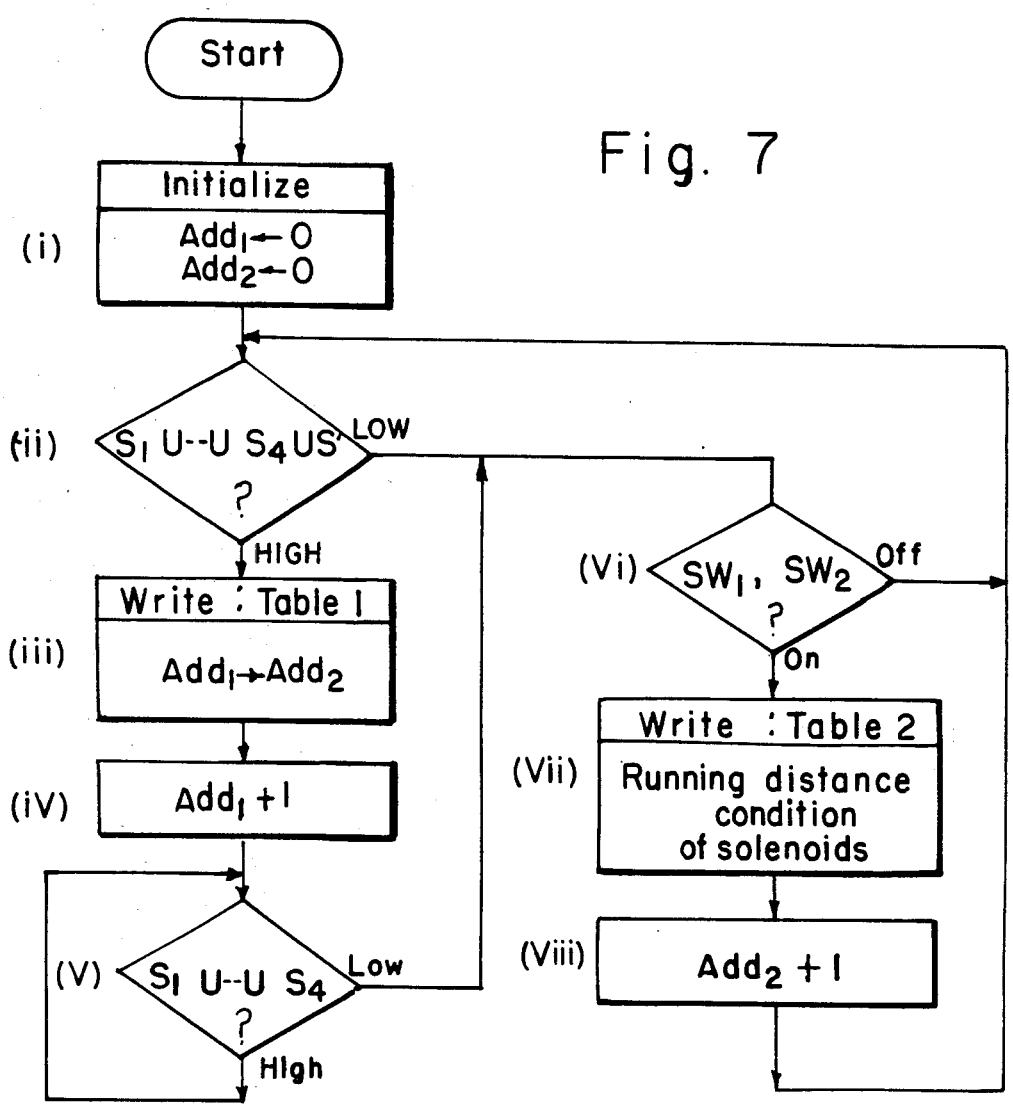
FIG. 7 is a flow chart of the present invention while the vehicle is in the teaching mode.
FIG. 9 is an explanatory view of the data-array construction of a couple of Tables used in the present invention.

Two Tables (1), (2) as outlined in FIG. 9 are provided in order to store data therein and to retrieve data therefrom. Tables (1) and (2) are provided within microcomputer (17), as depicted in FIG. 6. In Table (2), there are consecutively stored data for actuating and halting the left and right solenoids (13), (14) together with the running distance from the starting point that has been traveled by the time of each of such solenoid events. As for Table (1), stored therein are the associated array addresses (Add2) of Table (2) to be referred back to respectively upon completion of the consecutive guide-line following control steps.

FIG. 7 shows a flow chart according to the present invention while the vehicle is in the teaching mode.

By means of the starting switch (18'), there is effected initialization (i) of the array addresses of Tables (1), (2). After checking whether there is any high-signal ($S_1$)-($S_4$). (S') at step (ii), if a high signal is detected, an address (Add2) of Table (2) is written into an address (Add1) of Table (1) at step (iii). Then, the address (Add1) of Table (1) is subjected to an increment at step (iv), and the system remains in a standby loop until the high-signal ($S_1$)-($S_4$), (S') from the guide-line detector (3), (4) shifts to low at step (v). In the meantime, guide-line following control is effected in accordance with the output of the detectors (3), (4). When no high-signals from the detectors (3), (4) are present, the ON/off state of the switches ($SW_1$), ($SW_2$) is determined at step (vi). If there is an alteration in the state of one of the solenoids, the running distance traveled in a given time together with the coded alteration condition is written in Table (2) at step (vii); then the address of Table (2) is subjected to an increment at step (viii), to thus show an array address (Add2) of the domain to be written in at the next subsequent event.

Figure 8:
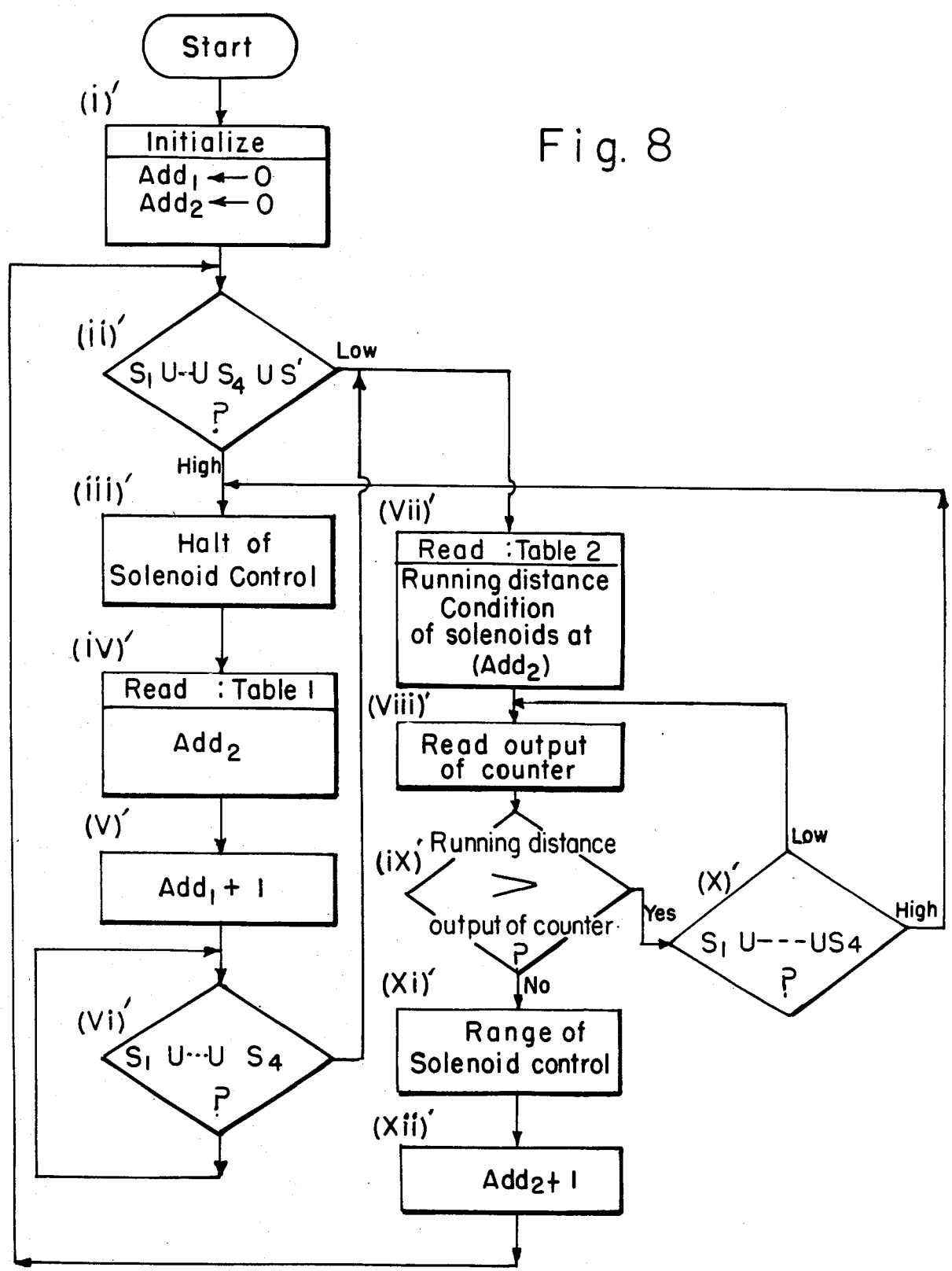
FIG. 8 is a flow chart while the vehicle is in the playback mode.

FIG. 8 is a flow chart according to the present invention while the vehicle in the playback mode.

Designated at steps (i)', (ii)' are initialization and checking of high-signal ($S_1$)-($S_4$), (S') from any detector, similar to the description given in FIG. 7. When there is any high-signal ($S_1$)-($S_4$), (S') present, control of the left and right solenoids is halted at step (iii)'; then the address of Table (2) is read on Table (1) at step (iv)' to restore access to Table (2); and the address of Table (1) is thereupon subjected to an increment at step (v)' so as to thus show the next subsequent domain. Then, the system is kept in the standby mode until the receipt of low-signals from the detectors (3), (4) at step (vi)'.

When ($S_1$)-($S_4$), (S') are low, then the stored running distance and alteration of the solenoids are read from the pertinent domain of the address (Add2) of Table (2) at step (vii)'; the output result of the counter (C) (which is measuring the distance traveled) is read at step (viii)'. If the running distance is greater than the output of counter (C) (step (ix)'), and if the signals ($S_1$)-($S_4$) remain low (step (x)'), the system remains in a standby loop until the time where the value from the counter (C) reaches the said running distance. Then, at the time the distance traveled has reached the distance on Table (2), the solenoids are properly altered in accordance with the data content of Table (2) and the pertinent signal level is delivered to the left or right solenoid (3), (4) at step (xi)'. Then the address of Table (2) is subjected to an increment at step (xii'), and the address of Table (2) to be referred to at the next subsequent occasion is introduced.

If, at the time of reading out the stored running distance on the domain of address (Add2), it is found that such running distance is less than the value of the counter (C), then the stored command for the left or right solenoid at such running distance is delivered outright to the pertinent solenoid.

Control operations are performed as described above.

The reason for providing table 1 and table 2 will now be explained.

As for guide lines which may be provided midway in the travel course, it is preferable to provide each of them immediately after completion of a pronounced turning motion by the vehicle, since any directional error of the vehicle deflecting it from the aimed orientation, (as might result from the turning motion), may then be corrected by means of such midway guide lines before the course deviation gets larger. For example, during the teaching operation a set of data of "Right-hand solenoid; ON, Running distance; 59 m are stored at address 100 of table 2 and a guide line is disposed immediately thereafter to start at the running distance of 60 m. However, during subsequent travel under playback control, there might possibly occur, (on account of slipping of the wheels), error in reproducing the turning radius or the like, such that the vehicle actually enters the guide line at a time when the reading of the distance traveled (=the output value of the distance counter), as measured on the real time basis by the vehicle in such a playback control operation, is still as low as 58 m. In such a case, if upon the vehicle leaving the guide line, the playback control step is effected in accordance with the data stored in said address 100 (thus the righthand solenoid; ON here), then the intention of using the guide line for correcting the directional error at 60 m would completely be ignored and thus become meaningless. In order to avoid such an event, it is necessary, at the time of leaving the guide line, to ignore the data stored in said address 100, namely to issue a command of jumping from address 99 to address 101. The present invention provides means for attaining this aim by using Table 1. Thus, the pertinent address of Table 2 to be read out upon leaving the guide line is forcibly defined by Table 1. It is thus possible to avoid the confusion that would otherwise occur in the case of providing quite a short distance between a point of manipulation control by said first control means (teaching-playback control) and a next subsequent guide line, namely the possibility of the vehicle prematurely entering a guide line prior to effecting the control step by the first control means, on account of a discrepancy between the running distance memorized while in the teaching mode and the running distance sensed as actually traveled while in the subsequent playback operation. This feature eliminates the possibility that the second control means could operate the vehicle and then return control to the first control means which would thereafter execute a stale command, thus letting the vehicle run in substantial deflection or deviation from the predetermined direction.

Figure 5:
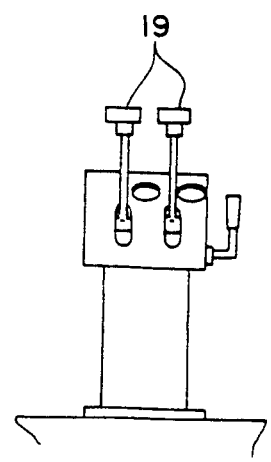
FIG. 5 is a front end view of a manipulation panel according to the present invention.

Shown in FIG. 5 is a manipulation panel for manipulating the switches ($SW_1$), ($SW_2$) and so forth, with a manipulation lever (19) provided as illustrated.

Shown in FIG. 10 is a specific vehicle travel course, wherein the guide lines and the vehicle are designated at (A) and (B), respectively.

It should be noted that the guide lines and the sensors are not limited to a contactless type (such as: magnetic material pieces and magnetic sensors, light-emitting pieces and photo-sensors, or the like), but may as well be the contact type, for instance one wherein a track is provided at predetermined checkpoints and the vehicle body is equipped with sensor roller wheels which come into contact with the track from either side.

We claim:

1. An apparatus for automatically running a vehicle over a predetermined course which has at least one guidelines therein, said vehicle having a front and a rear, comprising:

means for storing data which control said vehicle over said predetermined course, said data including a steering signal and a traveling distance signal corresponding to said steering signal, said data being arranged in data blocks with each block corresponding to a distance between successive guidelines;

means for manually controlling said vehicle over said predetermined course to cause said storing means to store data about said course;

means for detecting the presence and location of said guidelines, said detecting means including first and second groups of sensors transversely mounted on said vehicle front and rear respectively, said second group of sensors including a middle sensor mounted substantially in the middle of said vehicle rear for detecting when the middle of the vehicle is adjacent a guidelines;

means for measuring distance traveled by said vehicle;

first control means for controlling said vehicle in accordance with said stored data and said distance traveled;

second control means for controlling said vehicle in accordance with said guidelines location when one of said sensors detects a guidelines; and control switch means for switching vehicle control from said first control means to said second control means when one of said guidelines is detected, and switching vehicle control from said second control means to said first control means when one of said guidelines is no longer detected, to cause said vehicle to be controlled in accordance with a data block which reflects actual vehicle position with respect to said successive guidelines.

2. An apparatus according to claim 1 wherein said storing means includes:

steering data memory means for storing said data blocks, each block including at least one address corresponding to one steering signal and one traveling distance signal; and steering data selecting means for selecting an address which reflects an actual position of said vehicle with respect to said guidelines.

3. Apparatus for controlling the travel of an automatically running vehicle over a predetermined course which has at least one guideline therein, said vehicle having a front and a rear, comprising:

means for storing vehicle commands which control said vehicle over said predetermined course;

means for detecting the presence and location of said guideline, said detecting means including first and second groups of sensors transversely mounted on said vehicle front and rear respectively;

means for controlling said vehicle in accordance with said stored vehicle commands when said guideline is not detected;

means for controlling said vehicle in accordance with said guideline location when said guideline is detected by one of said sensors; and means for switching vehicle control from said guide rod location to said stored commands so that said vehicle is controlled by stored commands corresponding to actual vehicle position on said course.

4. A method for controlling the travel of an automatically running vehicle over a predetermined course which has at least one guideline therein, said vehicle having a front and a rear, comprising:

storing vehicle commands which control said vehicle over said predetermined course;

detecting the presence and location of said guideline with first and second groups of sensors transversely mounted on said vehicle front and rear respectively;

controlling said vehicle in accordance with said stored vehicle commands when said guideline is not detected; and controlling said vehicle in accordance with said guideline location when said guideline is detected by one of said sensors, vehicle control switching from said guideline location to said stored commands so that said vehicle is controlled by stored commands corresponding to actual vehicle position on said course.

* * * * *